Patented May 29, 1945

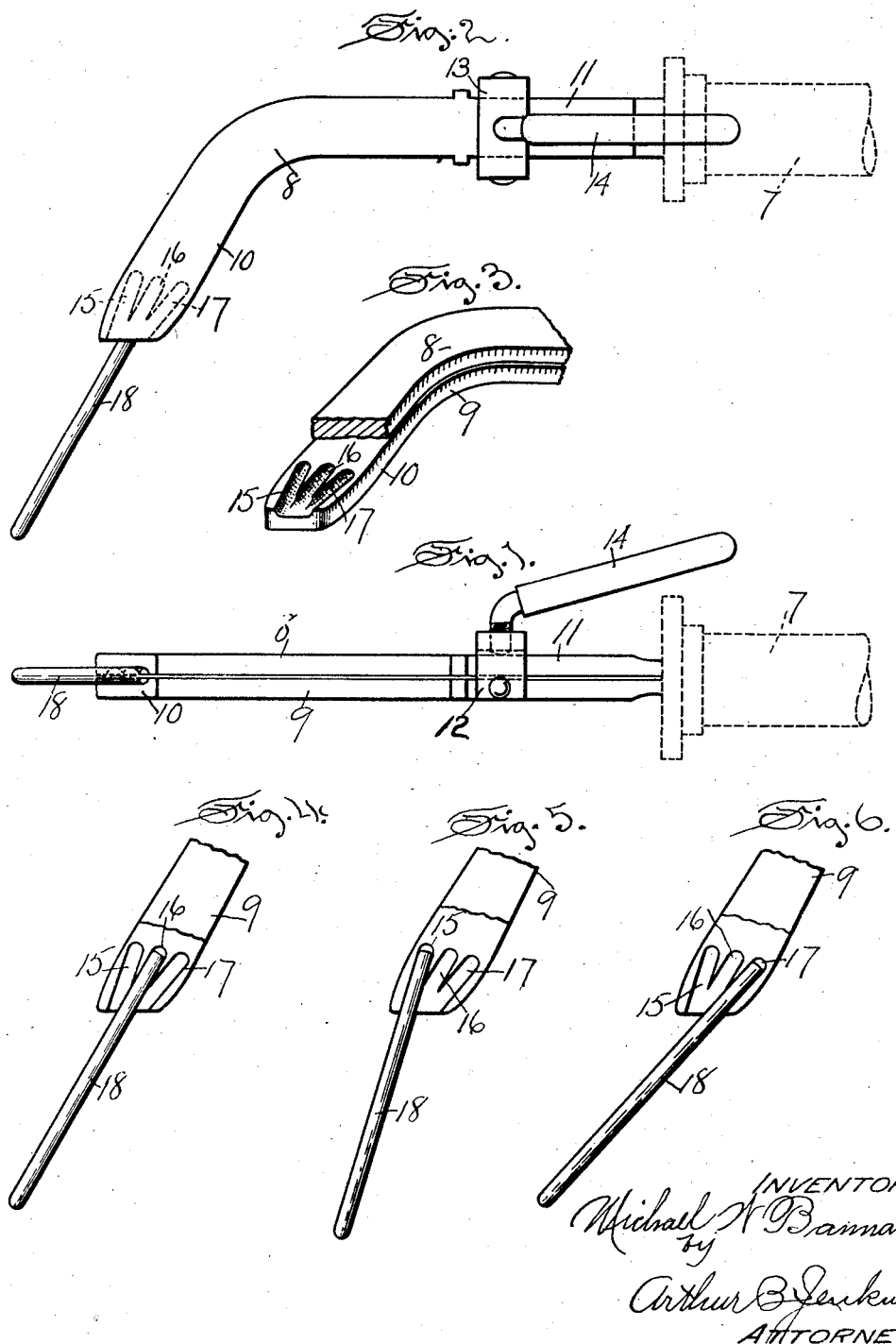

2,377,203

UNITED STATES PATENT OFFICE 2,377,203

HOLDER FOR WELDING ELECTRODES

Michael W. Bannan, New Britain, Conn.

Application July 7, 1943, Serial No. 493,726

1 Claim. (Cl. 219—8)

My invention relates to the class of devices which are employed for the operation generally known as arc welding, and an object of my invention, among others, is the production of a holder for the purpose mentioned by means of which electrodes may be presented to the work being welded in all of the various positions without material obstruction and with minimum obstruction to the view of the worker; a further object of the invention is to provide means for holding the electrode in such manner that the electrode can be consumed to a maximum extent in the welding operation; and a further object of the invention is to provide means in a holder whereby the electrode may be held in a particularly secure and efficient manner.

One form of an electrode holder embodying the invention and in the construction and use of which the objects herein set out, as well as others, may be attained is illustrated in the accompanying drawing, in which—

Figure 1 is a side view of my improved electrode holder.

Figure 2 is a top plan view of the same.

Figure 3 is a detail view of the outer end of the clamping blades partially broken away to show construction.

Figures 4, 5 and 6 are views similar to Fig. 3 but illustrating the electrodes placed in different positions in the holder.

In the accompanying drawing the numeral 7 denotes the stock or handle which may be employed in connection with my improved holder and which therefore is of a form common to such devices. My improved holder comprises two blades or bars more or less flat in form and having the ends shaped to fit within an opening in the end of a handle in common use and which blades may be inserted into said opening and held therein by the closeness of the fit or by any other suitable means which may be desired. These blades 8—9 comprise a pair of blades of similar shape to conform one to the other, and which are placed in close contact with each other and which are held in such close contact at the inner ends of the blades by the stock or handle 7.

In the use of these welding electrodes in welding operations it is commonly the case that the points or locations to be reached for such operations are in places not freely accessible for the outer or working end of the electrode, as obstacles are frequently positioned to prevent such free access and also to obstruct the view of the operator from the work being performed, and I have therefore so constructed the blades that such difficulties are overcome to a great extent. To effect this purpose the ends of the blades 8—9 are offset to a considerable degree as at 10, the offset portion, however, being preferably shorter than the main portion 11.

A clamping frame of U-shape and comprising branches 12 and a cross piece 13 is secured by means of rivets entered through the branches 12 to the blade 9 and a blade clamp comprising a handle 14 is screw threadedly entered through the cross piece 13 of the frame with its inner end abutting the blade 11. The blades, while closely fitted within the stock or handle sufficiently to retain them therein for all working purposes, may be disengaged from the stock or handle by the application of a little pulling force, and at the same time said blades have sufficient spring action when unrestrained to separate sufficiently to release the electrodes which are held in the outer ends thereof and enable them to be readily inserted or removed. By turning the handle and screwing its inner end inwardly the blades may be tensioned and closed together sufficiently to securely hold the electrodes for working operations, and by reversing the action of the handle said tension will be sufficiently released to permit removal of the electrodes or to permit the insertion thereof.

Each of the blades has finger shaped recesses 15—16 and 17 extending inwardly from the end of the blades, the recesses in each of the blades registering with those in the other blade so that when the blades are clamped together holes, preferably round in cross section, extend into the holder at angles to each other, these holes diverging from the end of the blade inwardly. The central recess or hole 16 is preferably in line with the axis of the curved end 10 of the holder and the other two holes or recesses 15 and 17 preferably extend at equal angles from the hole or recess 16, as shown in Figs. 4, 5 and 6 of the drawing from which it will be seen that an electrode may be located in line with the axis of the end of the blade or may be inclined to the left or to the right as may be desired.

These recesses or holes are of a size to closely fit the end of an electrode 18 so that when the two blades are placed together and held in close engagement by the stock or handle 7 as hereinbefore described the electrodes will be secured in position against accidental displacement.

This construction of the holder blades is such as to enable the operator to fully see the crater of his arc at all times, thereby speeding up the operation and generally improving the quality of the weld due to the fact that the operator can tell whether or not he is creating a too short or too long an arc, thereby overcoming difficulty in this respect present with the use of electrode holders now in common use. This holder enables the operator to assume a comfortable position in any of the four flat, vertical, horizontal, or overhead operations, as well as in corners that would be found difficult of access with many of the holders now in common use.

Irrespective of the position the operator is working in he can readily see his arc at all times and is thereby enabled to use up substantially all of the electrode without changing his position or that of the electrode which is of vital importance at the present time and avoids various requirements now employed for uniting short stubs to enable this scarce and vital material to be substantially fully consumed, particularly in the art of armor plate welding.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

A welding electrode holder comprising a handle having at its inner end an opening rectangular in shape in cross section, two flat blades fitting closely against each other and closely fitting said opening and workably held by frictional engagement therein, registering recesses in the outer ends between said blades and extending from a common open mouth inwardly in diverging directions and of substantially even length and closed at their inner separated ends, and means in proximity to the end of the handle for releasing pressure upon said blades to loosen said electrode from pressure of said blades.

MICHAEL W. BANNAN.